United States Patent [19]

Welch

[11] Patent Number: 4,732,512
[45] Date of Patent: Mar. 22, 1988

[54] PNEUMATIC CONVEYOR SYSTEMS

[75] Inventor: Phillip J. Welch, Knutsford, England

[73] Assignee: British Nuclear Fuels plc, Risley, England

[21] Appl. No.: 749,719

[22] Filed: Jun. 28, 1985

[30] Foreign Application Priority Data

Jul. 11, 1984 [GB] United Kingdom ............... 8417712

[51] Int. Cl.⁴ ............................................. B65G 51/20
[52] U.S. Cl. ...................................... 406/84; 406/110; 406/19
[58] Field of Search ................ 406/176, 192, 111–113, 406/28, 84, 110, 19, 21, 105; 137/625.47

[56] References Cited

U.S. PATENT DOCUMENTS

| | | | |
|---|---|---|---|
| 1,059,845 | 4/1913 | Delahunty | 137/625.47 |
| 3,603,640 | 9/1971 | Leoff | 406/84 X |
| 3,778,006 | 12/1973 | Martin | 406/112 |
| 3,799,622 | 3/1974 | Hek | 406/172 |

FOREIGN PATENT DOCUMENTS

| | | | |
|---|---|---|---|
| 45625 | 2/1982 | Euroepan Pat. Off. | 406/19 |
| 124486 | 9/1979 | Japan | 406/84 |
| 327445 | 4/1930 | United Kingdom. | |
| 1462989 | 1/1977 | United Kingdom. | |
| 672115 | 7/1979 | U.S.S.R. | 406/105 |

Primary Examiner—Joseph F. Peters, Jr.
Assistant Examiner—Paul E. Salmon
Attorney, Agent, or Firm—William R. Hinds

[57] ABSTRACT

A rotatable valve member having four ports is provided in a pneumatic conveyor system to permit the smooth docking of a carrier at a station. One port communicates through a branch duct with a main duct for the transport of carriers to the station. The remaining three ports communicate respectively with an exhauster, the docking station and atmosphere. The valve member provides communication between any two adjacent ports and during rotation controls the pressure balance on the carrier to ensure a smooth arrival at the docking station.

4 Claims, 5 Drawing Figures

U.S. Patent    Mar. 22, 1988    4,732,512
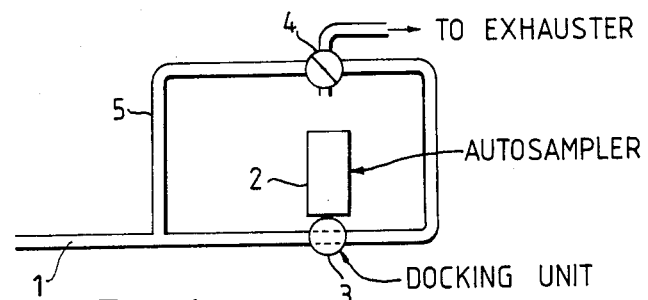
Fig. 1
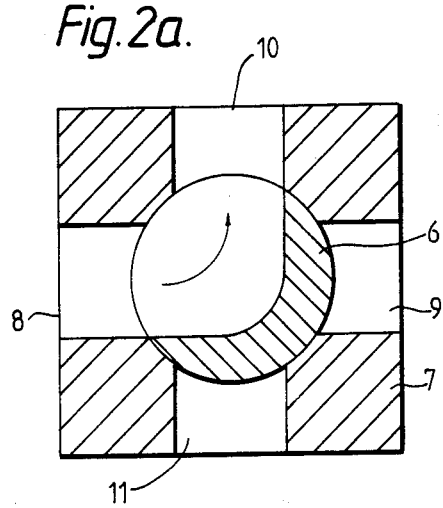
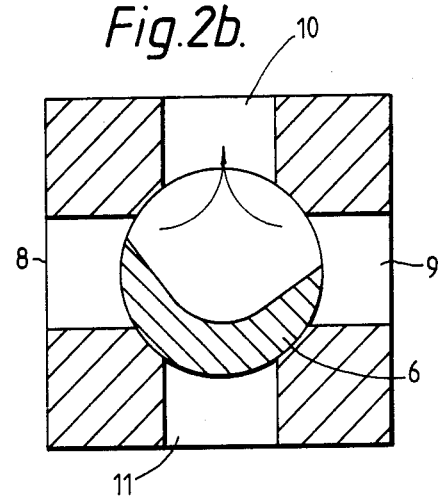
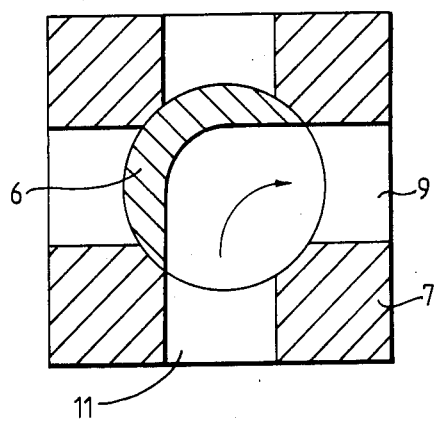
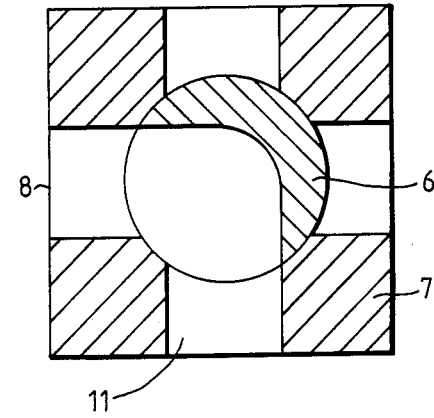

PNEUMATIC CONVEYOR SYSTEMS

BACKGROUND OF THE INVENTION

The present invention concerns a pneumatic conveyor system.

In a pneumatic conveyor system objects are transported to and from stations along ducts and it is desirable to achieve a smooth arrival of docking of objects at the stations.

FEATURES AND ASPECTS OF THE INVENTION

According to the present invention a pneumatic conveyor system comprises a main duct for the transport of objects to and from a docking unit, a branch unit from the main duct communicating with a first port in a valve body, the valve body having three further ports communicating respectively with an exhauster, the docking unit and atmosphere, and a rotatable valve member in the body capable of providing communication between any two adjacent ports and isolating the other two ports.

DESCRIPTION OF THE DRAWINGS

The invention will be described further, by way of example, with reference to the accompanying drawings; in which:

FIG. 1 is a schematic diagram of a portion of a pneumatic conveyor system;

FIGS. 2a to 2d inclusive depict a valve used in the conveyor system of FIG. 1.

DESCRIPTION OF THE PREFERRED EMBODIMENT

FIG. 1 is a schematic diagram of a portion of a pneumatic conveyor system in which objects are propelled pneumatically along a duct 1 to and from a sampling station 2. For example, the objects can be carriers each containing a sample bottle which can be transported between a control station, such as a laboratory and the sampling station. A docking unit 3 for carriers is provided at the sampling station 2 and it is required to control the arrival of the carriers at the docking unit.

The carriers are propelled pneumatically along the duct 1 by creating a pressure drop (suction) ahead of the carrier in the direction of travel. Thus, at the sampling station one end of the conveyor system an exhauster (suction pump) communicates with the duct 1 by way of a control valve 4 located in a branch duct 5. As shown in FIGS. 2a to 2d, the valve 4 comprises a cylindrical valve member 6 rotatable within a valve body 7 having ports 8, 9, 10 and 11. Ports 8 and 9 communicate with the branch duct 5, port 10 leads to the exhauster (not shown) and port 11 is open to atmosphere. The valve member 6 is shaped as shown to provide an unobstructed flow path between any two adjacent ports.

Initially, to receive a carrier at the docking unit 3 the valve member 6 is set in the position shown in FIG. 2a. In this position the valve member allows communication between the exhauster and the duct 1 and blanks off the ports 9 and 11. A first proximity switch is provided to indicate this position of the valve member 6. The suction applied by the exhauster to the duct 1 draws a carrier along the duct to the junction of the duct 1 with the duct 5. On arrival at the junction the carrier trips a switch to energise a motor for the valve member 6 whereby to rotate the valve member 6 through 90°.

FIG. 2b indicates the valve member during rotation and with the exhauster port 10 communicating with the ports 8 and 9 with the port 11 remaining blanked off. The rotation of the valve member 6 through 90° can take approximately 15 seconds and during this rotation the pressure balance on the carrier reaches a value sufficient to draw the carrier slowly and smoothly into the docking unit 3. When the carrier arrives at the docking unit it triggers a switch which provides a signal to switch off the exhauster. The valve member 6 completes its 90° rotation which is signalled by a second proximity switch and then proceeds to rotate through a further 90° to reach the position shown in FIG. 2c. Should the second proximity switch be activated before the arrival of the carrier at the docking unit then this would be an indication of a fault condition. With the valve member in the position shown in FIG. 2c the duct 1 is isolated from the exhauster. The same exhauster can be employed to transport carriers to a number of sampling stations.

In position FIG. 2c the air inlet port 11 communicates with the docking unit 3 and the duct 1. Operation of a further exhauster at the opposite end of the system draws the carrier out of the docking unit 3 to return along the duct 1. As the carrier passes the T-junction of the duct 5 with the duct 1 it again activates the switch at the junction to signal the valve member 6 to rotate into the position of FIG. 2d. In this position the duct 5 communicates with the port 11 to permit unrestricted venting of the duct 1. The valve can remain in the position of FIG. 2d until it is required to despatch a further carrier to the sampling station.

I claim:

1. A pneumatic conveyor system, comprising a main duct for the transport of objects between stations, a docking unit and valve means associated with each station, the valve means including a valve body first, second, third and fourth angularly spaced valve ports, a branch duct leading from the main duct to the first port, an exhauster for creating suction in the main duct connected with the second port, means for connecting the third port with the docking unit, the fourth port opening to atmosphere, and a rotatable valve member in the valve body selectively operable to provide unobstructed communication between any two angularly adjacent ports of said ports in the valve body while blocking communication between the other ports of said ports, and said valve member in all positions blocking communication between two ports of said ports angularly separated by another of said ports.

2. A system according to claim 1 in which the ports are disposed at right angles in the valve body and the valve member is rotatable in a bore in the valve body.

3. A system according to claim 2 in which the valve member comprises a cylindrical member having a cut-out portion shaped to provide the unobstructed communication between any two angularly adjacent ports.

4. A pneumatic conveyor system according to claim 1 wherein said branch duct is connected with said main duct at a point relatively upstream of said docking unit, said third port communicates with said main duct at a point not relatively upstream of said docking unit, said ports are serially angularly spaced in numerical sequence about said valve body such that the fourth and first ports are angularly adjacent each other, and said rotatable valve member, in moving from a position in which it provides unobstructed communication between any two angularly adjacent ports to a position in which it provides unobstructed communication between one of those ports and the next angularly adjacent port in the direction of rotation, temporarily provides obstructed communication between the originally communicated two ports and the next angularly adjacent port while always blocking at least one port.

* * * * *